US006236580B1

(12) United States Patent
Aiello et al.

(10) Patent No.: US 6,236,580 B1
(45) Date of Patent: May 22, 2001

(54) MODULAR MULTI-LEVEL ADJUSTABLE SUPPLY WITH SERIES CONNECTED ACTIVE INPUTS

(75) Inventors: Marc F. Aiello, Oakmont; Peter W. Hammond, Greensburg; Mukul Rastogi, Monroeville, all of PA (US)

(73) Assignee: Robicon Corporation, New Kensington, PA (US)

( * ) Notice: Subject to any disclaimer, the term of this patent is extended or adjusted under 35 U.S.C. 154(b) by 0 days.

(21) Appl. No.: 09/543,965

(22) Filed: Apr. 7, 2000

Related U.S. Application Data
(60) Provisional application No. 60/128,834, filed on Apr. 9, 1999.

(51) Int. Cl.⁷ .................................................. H02M 5/45
(52) U.S. Cl. .............................................. 363/37; 363/65
(58) Field of Search ................................. 363/34, 36, 37, 363/65, 68, 71, 95, 98

(56) References Cited

U.S. PATENT DOCUMENTS

| | | |
|---|---|---|
| 5,625,545 | 4/1997 | Hammond . |
| 5,638,263 * | 6/1997 | Opal et al. .............................. 363/65 |
| 5,986,909 * | 11/1999 | Hammond et al. ..................... 363/65 |
| 6,014,323 * | 1/2000 | Aiello et al. ........................... 363/71 |

OTHER PUBLICATIONS

"Dynamic Performance and Control of a Static Var Generator Using Cascade Multilevel Inverters," Fang Zheng Peng et al., IEEE Transactions of Industry Applications, vol. 33, No. 3, pp. 748–755, May/Jun. 1997.

* cited by examiner

*Primary Examiner*—Matthew Nguyen
(74) *Attorney, Agent, or Firm*—Buchanan Ingersoll, P.C.

(57) ABSTRACT

An adjustable frequency multiphase power supply providing low harmonics to the line and load. The power supply having a plurality of power cells in each phase output thereof, each cell having an input side, and an output side. The input side is capable of converting single-phase AC into DC and for converting DC into AC to said source. The output side is capable of converting DC into a controlled AC output and for converting AC from said load to feed said DC bus. The respective outputs and respective inputs of the cells are series connected. Each cell can have a single-phase transformer connected either to the input side or the output side. The output side of each cell can be controlled to limit the harmonic content of the output AC to the load, and the input side of each cell can be controllable to limit harmonic content of the AC power feed to the source. The input and/or output sides can be interdigitated to limit harmonic components to the source and/or to reduce the harmonic content of the AC supplied to the load.

19 Claims, 10 Drawing Sheets

CUMULATIVE OUTPUT VOLTAGE OF 3 CELL SYSTEM
(CARRIERS SPACED 60°)

FIG. 9

CONVERTER AND INPUT VOLTAGE MATCHED IN PHASE
AND AMPLITUDE (NO POWER, NO VARs)

FIG. 10

FIG. 11 CONVERTER VOLTAGE SLIGHTLY LAGGING INPUT VOLTAGE BUT STILL MATCHED IN AMPLITUDE (POWER FLOWS TOWARD LOAD, NO VARs)

FIG. 12 CONVERTER VOLTAGE SLIGHTLY LEADING INPUT VOLTAGE BUT MATCHED IN AMPLITUDE (POWER FLOWS TOWARD INPUT, NO VARs)

FIG. 13 CONVERTER AND LINE VOLTAGE PHASE MATCHED BUT CONVERTER AMPLITUDE SLIGHTLY GREATER THAN INPUT AMPLITUDE (NO POWER TRANSFER, LEADING VARs)

FIG. 14 CONVERTER AND INPUT VOLTAGE PHASE MATCHED BUT CONVERTER AMPLITUDE SLIGHTLY LESS THAN INPUT AMPLITUDE (NO POWER, LAGGING VARs)

MODULAR MULTI-LEVEL ADJUSTABLE SUPPLY WITH SERIES CONNECTED ACTIVE INPUTS

This appln claims the benefit of Provisional No. 60/128,834 filed Apr. 9, 1999.

BACKGROUND OF THE INVENTION

Figure 1:
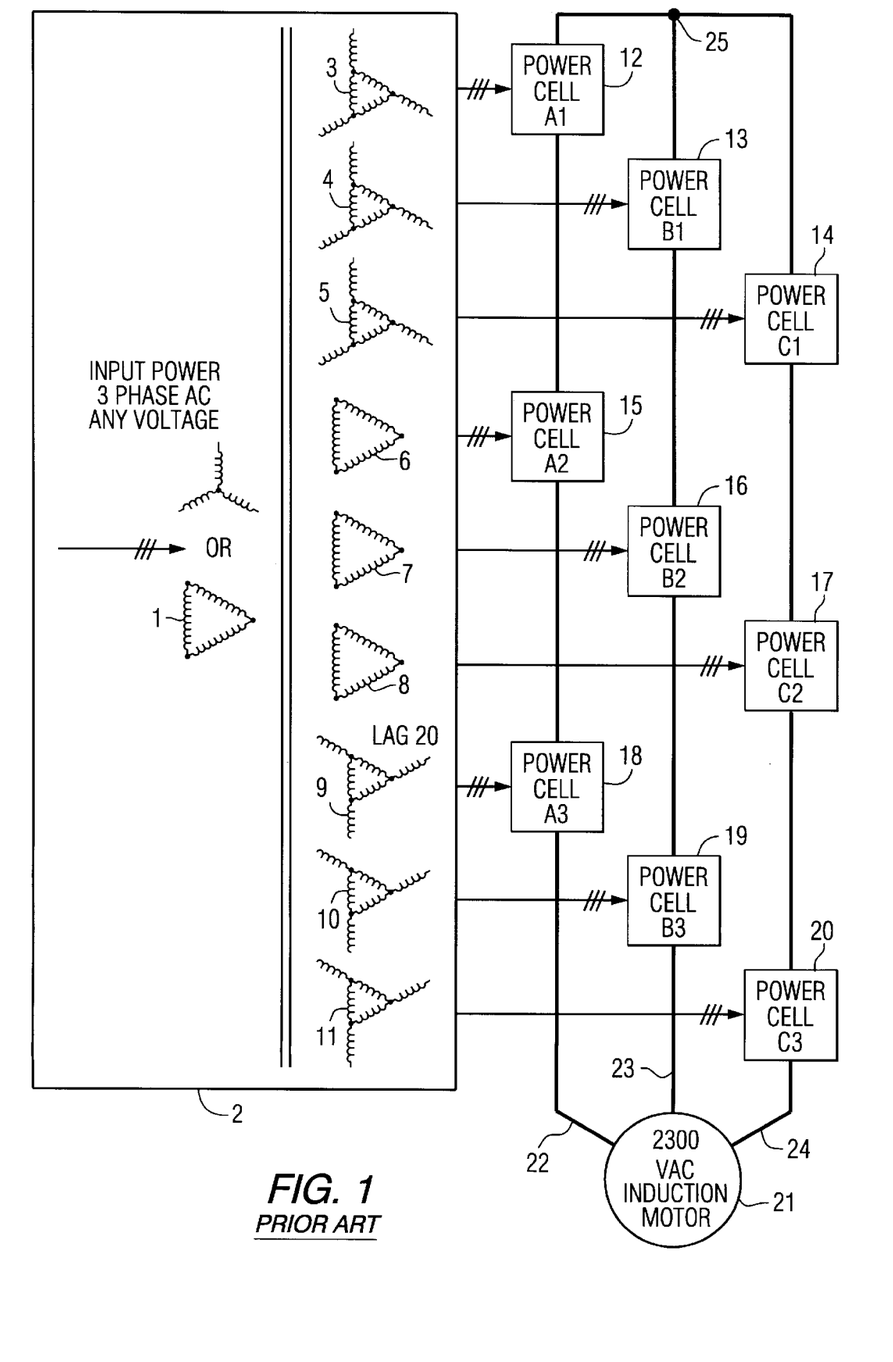
FIG. 1 shows a prior art drive with series connected outputs as shown in U.S. Pat. No. 5,625,545.

It is highly desirable to use modular multi-level converters to create a regenerative drive. The modular multi-level topography provides a design which can produce high output voltages while using lower voltage level switching devices. One such topography is shown in FIG. 1 and in U.S. Pat. No. 5,625,545 which is hereby incorporated by reference. In this design, a plurality of series connected inverters or cells form a three-phase output for variable frequency control of the motor. The series connected outputs of each cell are fed from a three-phase rectifier. Multiple three-phase windings of a single transformer feed the rectifiers in each cell. The cells as shown have a rectifying section, a capacitor storage section, and an inverter output section. Harmonic components on the input side are effectively canceled by the phase relationship in the transformer windings. This type of drive has been demonstrated to be highly efficient and provides low harmonic content on the input while providing a very low harmonic content variable frequency AC output to a three-phase motor.

Figure 2A:
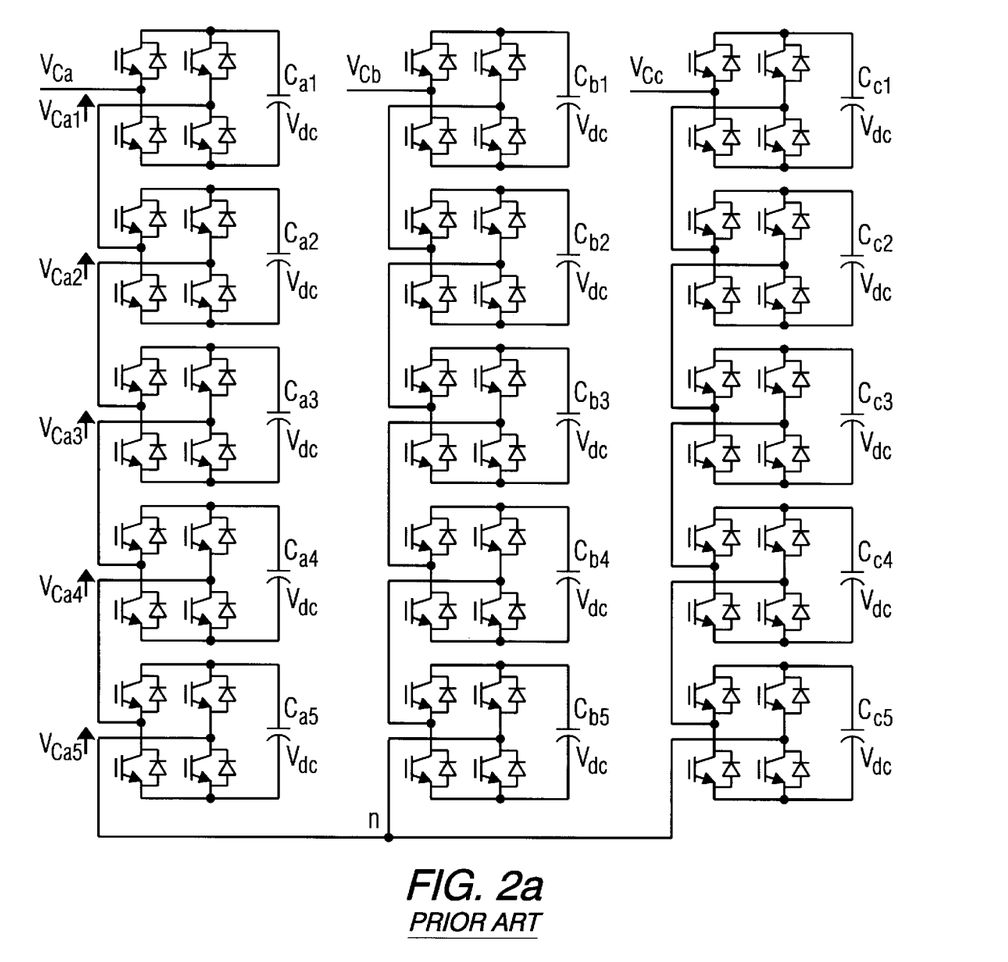
FIG. 2a shows a prior art eleven level cascade inverter as used in a static VAR generator system.
Figure 2B:
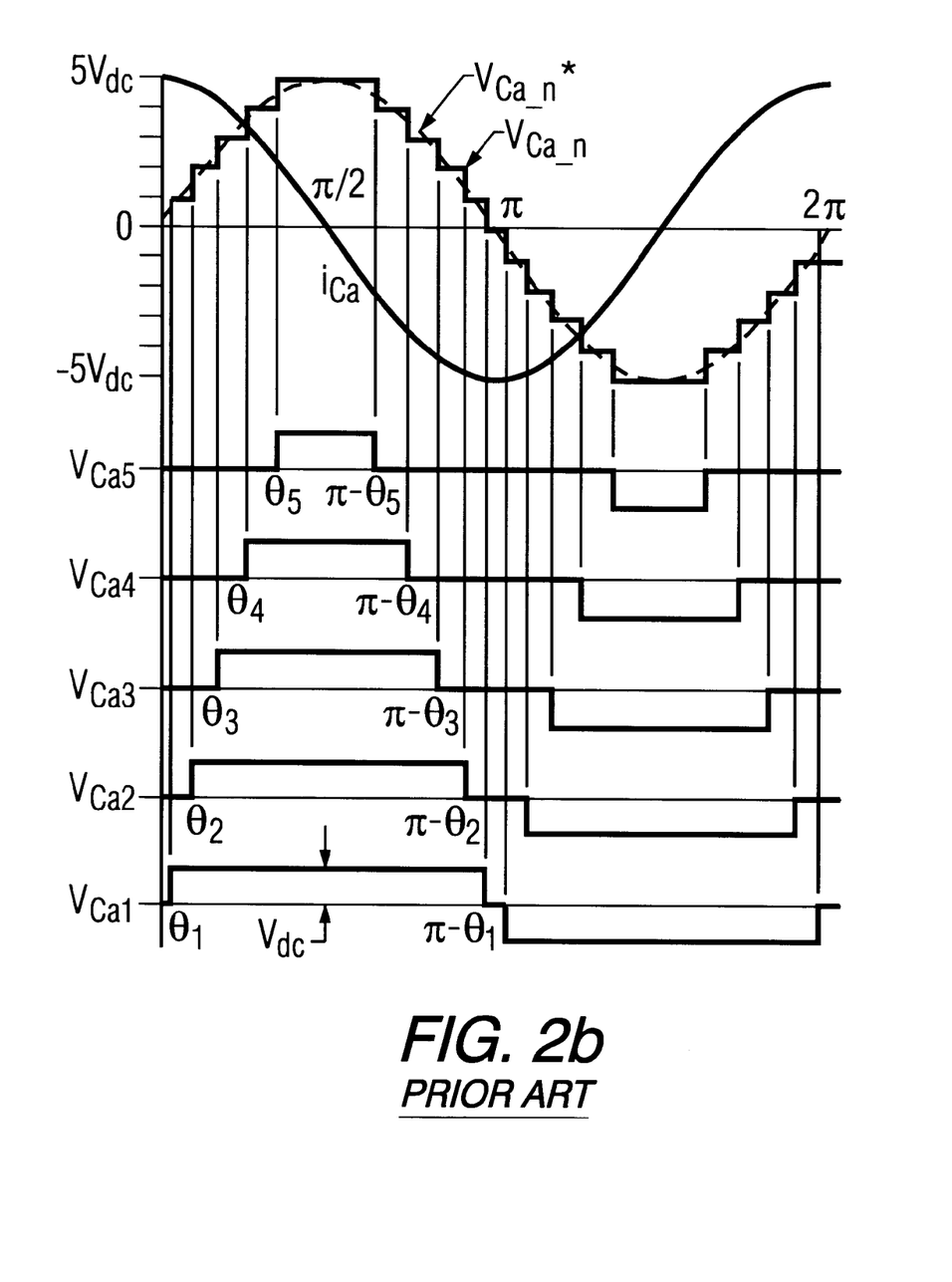

FIG. 2a shows a cascaded multilevel inverter for static VAR compensation/generation applications. The cascade multi-level inverter consists of single-phase full bridges, in which each bridge has its own separate DC source. The inverter of FIG. 2a can generate almost sinusoidal waveform voltages with each power semi conductor switching on and off only once per cycle. It can eliminate the need for transformers in a static VAR compensator. As shown in FIG. 2a, multiple inverters have their respective outputs connected in series. As shown, each H-bridge inverter unit generates a quasi-square waveform. As a result, the staircase voltage waveform shown in FIG. 2b is obtained. Switching phase angles are calculated off-line to minimize harmonics for each modulation index.

Figure 3A:
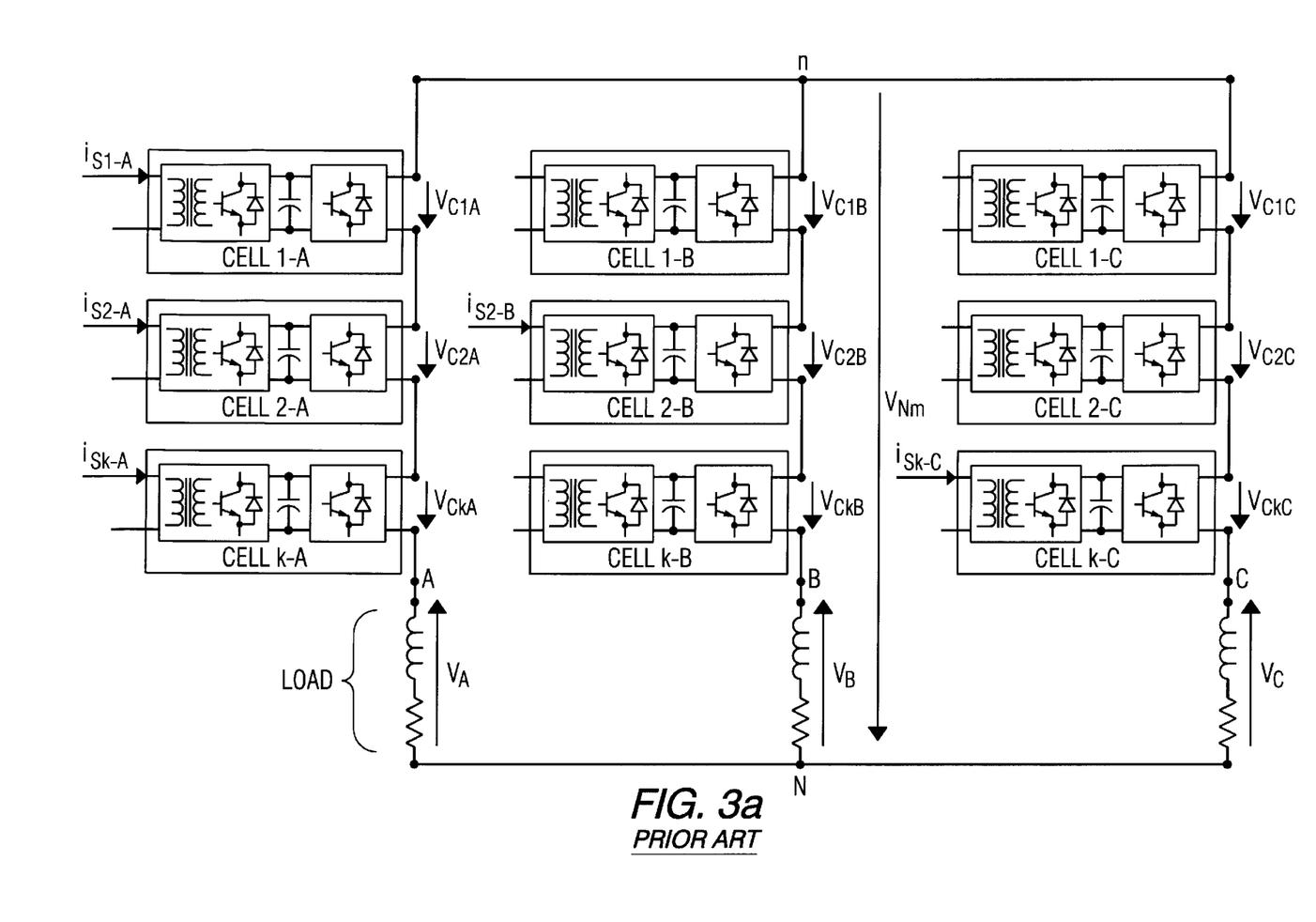
FIG. 3a shows prior art power circuit of a multi-level regenerative converter utilizing series connection of cells.
Figure 3B:
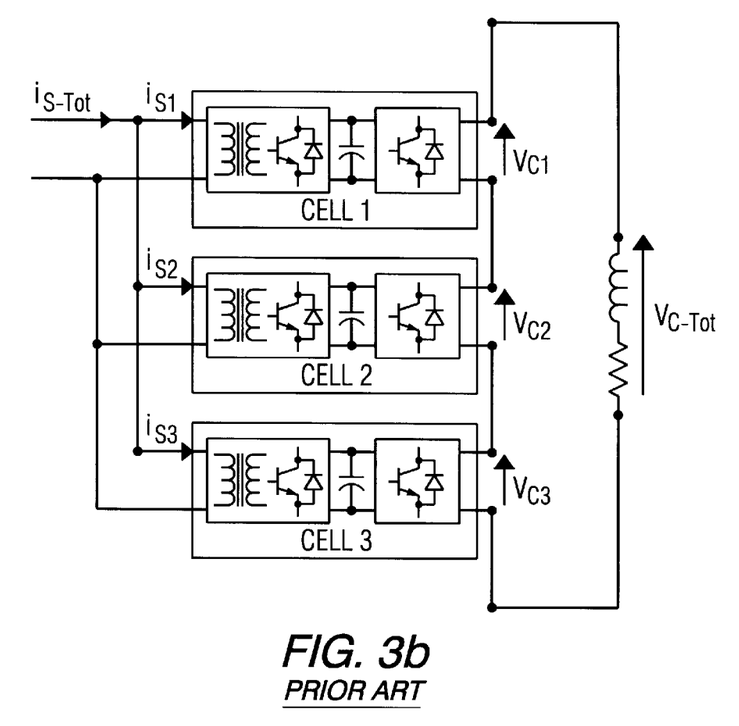
FIG. 3b prior art shows the interconnection of the cells in the converter of FIG. 3a with the interconnection of the input transformers in parallel and the series connection of the outputs.

FIG. 3a shows a multicell voltage source inverter as could be used in an AC voltage motor drive. The series connection of cells shown in FIG. 3a is also shown in more detail in FIG. 3b. As seen in FIG. 3b, the cells 1 through 3 have their output voltages VC1, VC2, VC3 connected in series. As shown in FIG. 3b, the input to each cell is a single-phase transformer and the three inputs to cells 1 through 3 can be connected in parallel across the line.

It is highly desirable to have a low-cost variable frequency drive or power supply which gives an output at medium voltage or higher while providing low harmonics to the line and load. In addition, it would be desirable if the device can transfer real power between the input and the load in both directions, and have controllable VAR demand (leading or lagging) at the input.

SUMMARY OF THE INVENTION

The invention provides for a power supply that can be used to supply three phase AC power in a controllable manner to a load. The preferred load can be any three phase device, and in particular an AC motor. The AC motor can be operated as a variable frequency device. The power supply operates from a three phase AC source. The output of the power supply is derived by three eighth AC legs each forming a single phase of a three phase output. Each of these legs are composed of cells which are capable of deriving an adjustable frequency output from a fixed frequency input. In standard preferred embodiments, it will be desirable that each of these phases have a cell which has an input side having a rectifier to convert the AC input power to DC voltage and currents. In addition, each cell will preferably have an inverter or output side which converts the DC supply from the input side to an adjustable output AC. The input of at least two of the cells in any given leg are connected in series. Similarly, at least two of the cells in a leg will have their respective output sides connected in series. As a result, the output voltage from each leg can be the sum of the series connected cell outputs. In a preferred embodiment, the cells will have a transformer in at least the input or output side. This provides for isolation and also for properly matching the desired input and output voltages. Some of the transformers, specifically at least one of the transformers that may be placed in the output side of a converter can boost the voltage of the output of such cell. As a result, the output voltage can be higher than that of other cells. Because the cells are in series and are controlled both on the input and output side, the respective waveforms utilized by both the input side and the output side can be controlled to reduce the harmonic content of the AC wavelength to the load and/or the harmonics imposed on the AC source. Each of the cells preferably will be a single phase unit, such that the series connected outputs will form one leg of a three phase output. Because of the arrangement, the rectifier and converters can be made having regenerative capability such that four quadrant operation can be achieved at a reasonable cost. In some embodiments, it will be desirable to utilize all of the controlled cells to be identical so as to achieve a reduction in cost by standardizing on a given piece of apparatus for module which makes up the overall system. Because of the modular style utilized in this drive, many variations are available which provide additional positive features for providing controllable AC power.

DESCRIPTION OF THE DRAWINGS

FIG. 2b shows a waveform of the multi-level cascade inverter of FIG. 2a.

DESCRIPTION OF PREFERRED EMBODIMENTS

The invention is directed to a modular multi-level power converter and can be practiced with a plurality of cells in each phase. The number of cells 2 through N can be chosen depending on the specific application. For higher voltages or when a larger number of steps in the waveforms are desired a larger number of cells can be used in each multi-phase output.

The previously cited Hammond U.S. Pat. No. 5,625,545 shows a power supply which accomplishes input harmonic current cancellation while using a modular multi-level converter. However, it does use a three phase incoming transformer of the zigzag or extended Delta winding type. That patent uses a modulation scheme in the output to provide an output signal which has reduced harmonics. The outputs of the cells in that patent are connected in series in each leg of the three-phase output. The present invention accomplishes both input harmonic current cancellation and a low harmonic content output through the utilization of series connected pulse-width modulated single-phase cells. The single-phase cells are each fed by a single-phase source, unlike the three-phase source of the above-mentioned Hammond patent. In the invention, the inputs to each of the single phase cells are connected in series. Also, in the topography of the invention, the outputs of the cells in each leg are connected in series.

Figure 4:
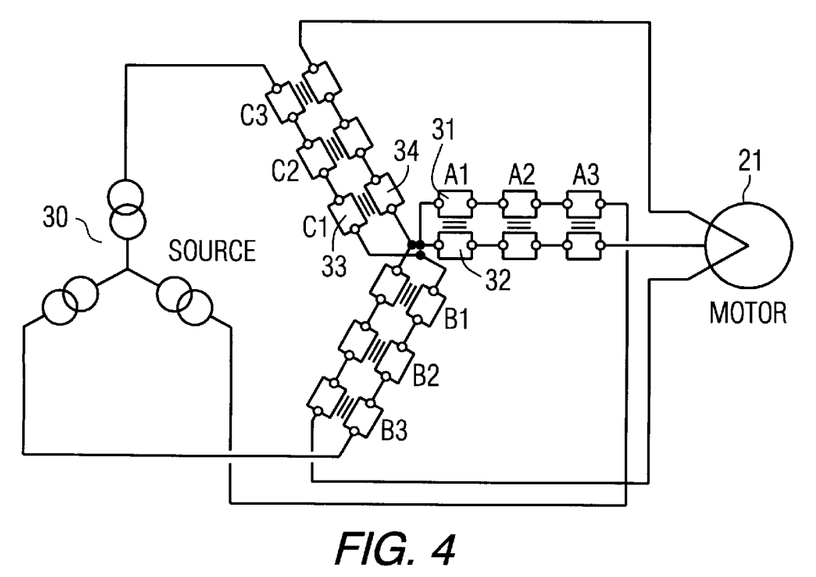
FIG. 4 shows an embodiment of the invention using three cells in series in each AC leg.

FIG. 4 shows one embodiment in which three cells are utilized in each of the output legs. A three phase power source 30 feeds single phase cells A1–3, B1–3, and C1–3. The output from these cells is then fed in the form of three-phase power to the motor 21, other loads can also be supplied. As can be seen, the single phase input to each of cells A1, A2, and A3 is connected in series. The output from cells A1, A2, and A3 is connected in series in one leg that feeds motor 21. The other cells C1–C3 and B1–B3 are similarly connected in series on both their input and output sides. Cell A1 has an input side 31 and a respective output side 32. Similarly, Cell C1 has an input side 33 and a respective output side 34. Cells A1–A3, B1–B3 and C1–C3 can be similarly constructed.

Figure 5:
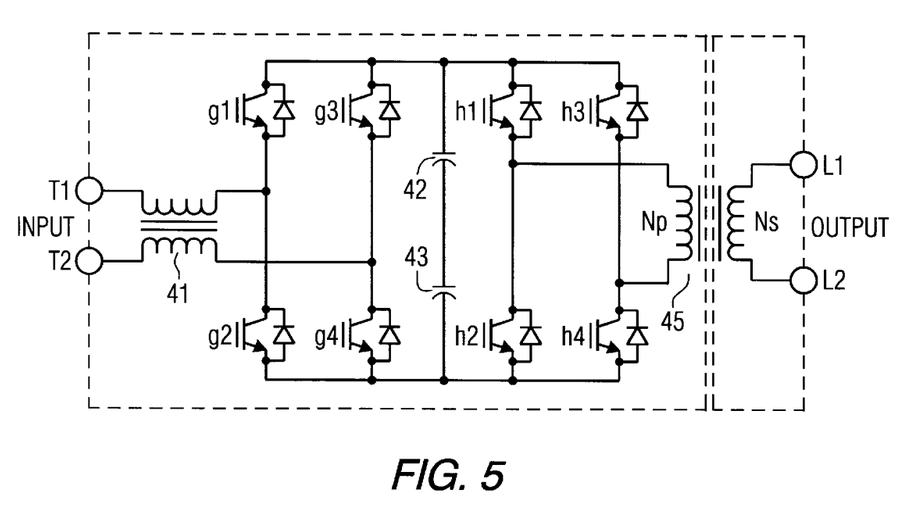
FIG. 5 shows one preferred design of a cell having a transformer on the output side of the cell.

FIG. 5 shows one embodiment of a cell. Each cell receives two sets of PWM functions; one for the converter and the other for the inverter. Each set of PWM function consists of a first pulse train to control the right pole pair, and a second pulse to control the left pole pair. In this embodiment, the cell has a transformer 45 on the output side. It is noted that this transformer 45 is a single-phased transformer. The transformers could provide step-up or step-down functions based upon the desired output voltage. The transformers in addition provide isolation between cells. The cell shown in FIG. 5 utilizes a set of input terminals T1 and T2. The input power is fed through an input reactance 41, in this case estimated at generally 5%. Depending upon the application different reactance values may be needed or desired. Input switching units g1–g4 provide for rectification of the incoming power from terminals T1 and T2 to provide a DC source to capacitors 42 and 43. In addition the input switches g1–g4, which are shown as IGBTs in this application, can also take energy that is stored on capacitors 42 and 43 and feed power back into the input on T1 and T2. In this instance, the drive can provide regenerative power and therefore support four-quadrant operation. Also, as this embodiment shows switching devices g1–g4 and h1–h4 as IGBTs, it is to be understood that other switching devices and, specifically, solid-state switching devices that provide a controlled switch function can be equally utilized in practicing this invention. In the embodiment shown in FIG. 5 two capacitors connected in series are utilized, however, it should be understood that a single capacitor or bank of capacitors in other arrangements could also be utilized depending on the energy storage requirement of the specific application. The capacitors 42 and 43 provide a means for storing energy within the cell. Switches g1–g4 can be controlled to generate an alternating voltage for the input 30, in order to provide power to the DC bus during motoring, or to provide power to the input during regeneration. Similarly, switches h1–h4 can be controlled to generate an alternating voltage for the motor 21, in order to provide power to the load from the DC bus or to absorb power from the load during regeneration. The output from the output switches h1–h4 is then fed into a transformer 45. The transformer 45 is a single-phase transformer which feeds output terminals L1 and L2. The transformer 45 may have an equal number of turns NP on the primary and NS on the secondary and provide no increase in voltage, or the turns ratio could be selected so as to provide a "step-up" or a "step-down" transformation. While the transformers 41 and 45 shown in FIG. 5 do not show taps, other transformers utilizing different winding configurations or taps may also be utilized in the practice of the invention.

Figure 6:
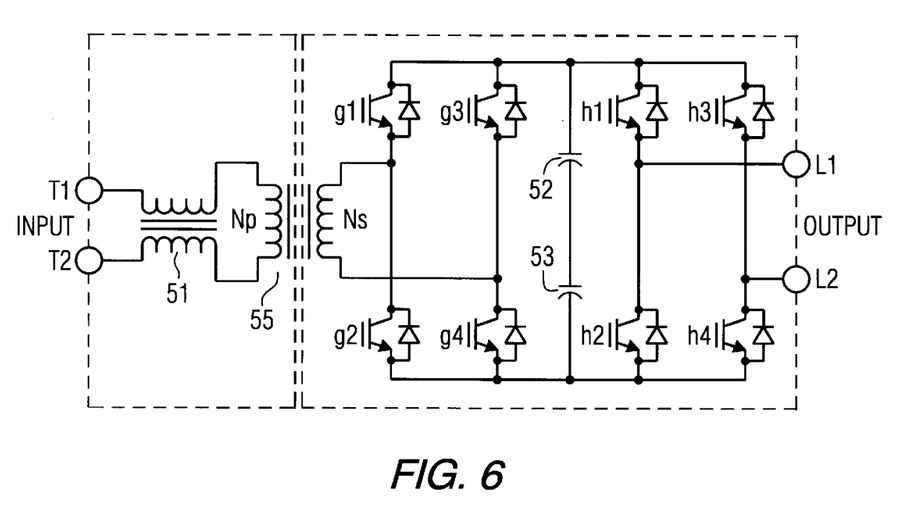
FIG. 6 shows another preferred embodiment of a cell utilized in the invention having a transformer.

FIG. 6 shows another embodiment of a power cell. In this embodiment an input transformer 55 is utilized. Similarly, T1 and T2 are the respective terminals of the input side of the cell, and feed into an input reactance 51. Transformer 55, as shown, could utilize an equal number of turns NP on the primary and NS on the secondary. However, as has been discussed with regard to the prior cell embodiment, the turns ratio could be selected so as to provide a desired step-up or step-down in voltage. The cell shown in FIG. 6 has switching devices g1–g4 which are IGBTs, and which operate as has been discussed with regard to the embodiment shown in FIG. 6. The energy from the storage capacitors can be changed into an AC output for terminals L1 and L2 through the utilization of output switches h1–h4. Again as has previously been discussed, power can flow from the input-side terminals T1–T2 to the output-side terminals L1–L2 or in a regenerative mode power can flow from the load terminals L1 L2 through the output switches to the capacitor and then be converted into AC power by the input switches so that power flows back through transformer 55 into the input-side terminals T1 and T2. As has previously been discussed with regard to FIG. 5, the embodiment shown in FIG. 6 can operate in all four-quadrants. In addition, the switching of input switches g1–g4 and output switches h1–h4 are controlled through pulse width modulation or other suitable modulation scheme to provide for low line harmonics and an output wave from having reduced harmonic content.

Figure 7:
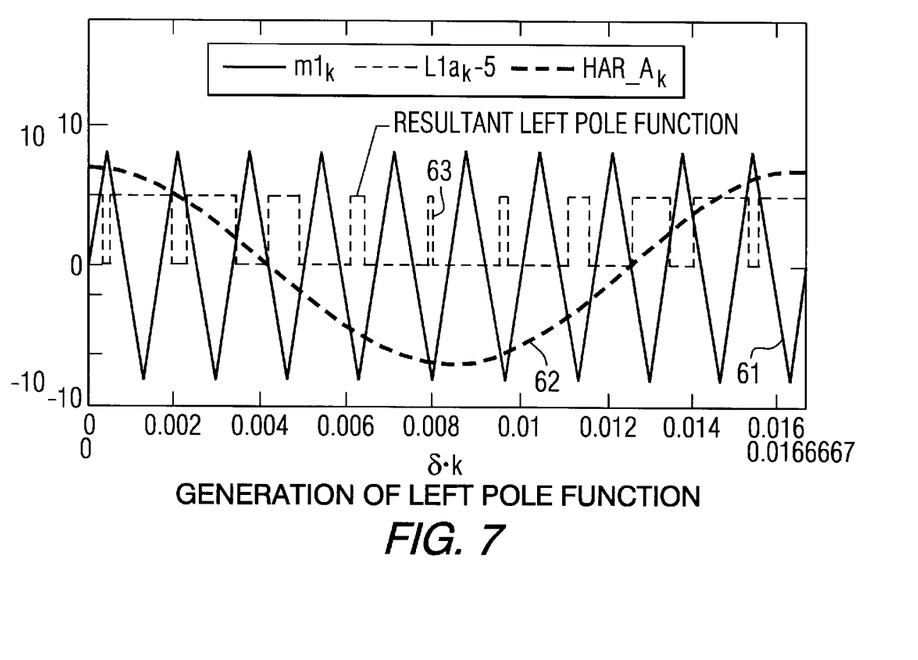
FIG. 7 shows a graph representative of the generation of the left pole function.
Figure 8:
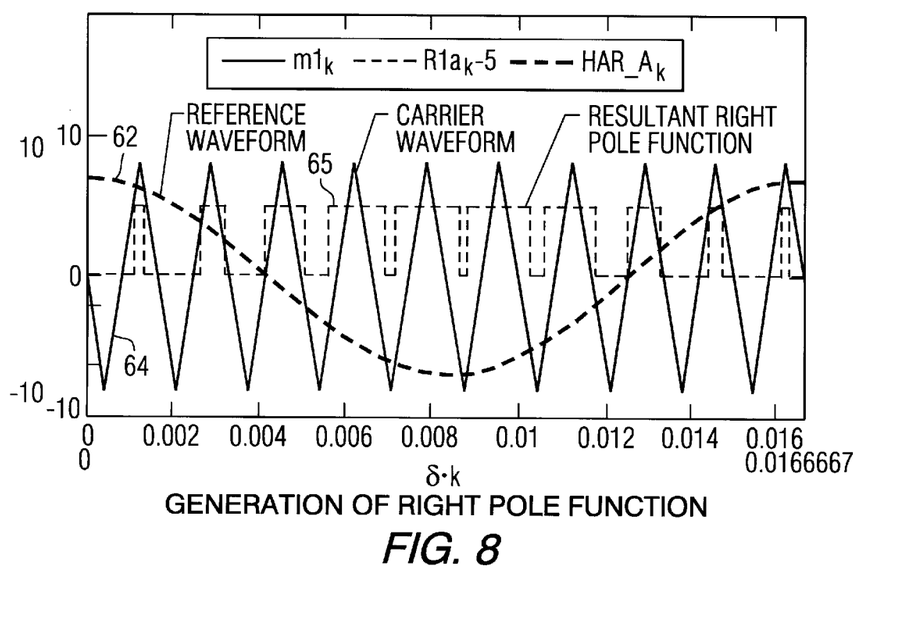
FIG. 8 shows a graph for the generation of the right pole function.

The modulation scheme of interdigitation as shown in the U.S. Pat. No. 5,625,545 can be utilized both on the input and output switches. In practicing the invention it is desirable to send one set of pulse width modulated functions to each cell having one function for the right pole pair and one function for the left pole pair. Functions for the left pole pair and the right pole pair are shown in FIG. 7 and FIG. 8, respectively. While one way of controlling the switch devices in a cell can be based on the "subharmonic" method, other switching methods can also be utilized in practicing the invention. As shown in FIGS. 7 and 8, each set of pole functions for each cell is modulated using the reference source appropriate for the phase (for instance "a" phase reference 62 is used for cells in rows A1, A2, A3, etc.), and one of N number of triangular carrier waves 61, 64 where N is the number of series cells. Note that the only difference between the pole functions as seen from FIGS. 7 and 8 is the inversion of the carrier frequency function 64. The phase shift between the N number of carriers is usually computed using the following relationship: phase shift=360°÷2N. The pole functions for the inverter transistors shown in FIGS. 7 and 8 are utilized by transistors h1, h2 (left pole) and transistors h3, h4 (right pole). When the left pole function in FIG. 7 is high, h1 is closed and h2 is open. The condition is reversed when the left pole function is low. Conversely, transistor h3 is closed and h4 open when the right pole function in FIG. 6 is high and vice versa. The condition in which the left and right pole functions are high (or low) at the same instance produces a zero voltage condition on the cell output. In normal operation, both transistors in a given pole will never be opened or closed at the same time. In general, the cell output voltage follows the function: V out=(L(t)−R(t))×V bus, where L(t) and R(t) are time-dependent pole functions.

Figure 9:
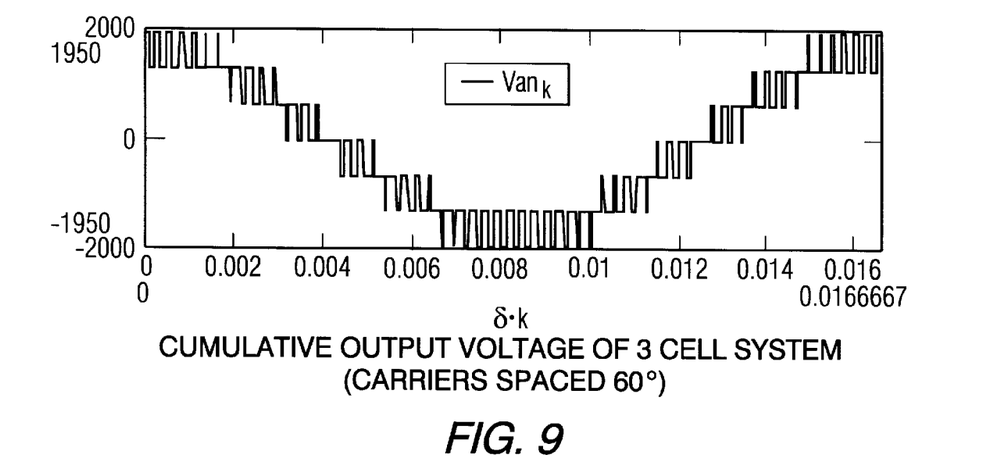
FIG. 9 shows the cumulative output voltage of a three-cell system.

For a given phase group of the multi-cell inverter, each series cell can be modulated with a phase shifted carrier function (as defined by the relationship where the phase shift equals approximately 360° divided by 2N.) Each series cell in a phase group utilizes the same reference waveform (for instance phase "a" reference). The cumulative voltage of the series combinations of the N cells produces a voltage waveform with a relatively high content of the fundamental reference voltage and a much smaller content of unwanted harmonics. FIG. 9 shows the cumulative output voltage of a three-cell system such as that shown in FIG. 4. Note that the phase carriers were displaced 60° which is consistent with the phase shift equaling 360 divided by 2N (where in this case N equals 3). This type of action produces a "clean" output waveform such as that described by the Hammond patent. However, the "clean" input of the Hammond patent variable frequency drive is accomplished by harmonic current cancellation as a result of the transformer phase shifting the three-phase input sources to each cell. This can require each transformer design to be dependent not only on the output voltage rating (the number of cells required) but also on the drive horsepower rating or current capacity.

The method of the present invention for input harmonic cancellation is to "mirror" the output topography as described above. Cell pole functions for the input of the cell (transistor functions g1, g2, g3 and g4) then become similar to the output control described above, except the reference waveforms for the modulator must be phase-locked to the input source voltages (usually 50 or 60 hertz). The two degrees of freedom available for input power control become phase control and amplitude control. The phase-shift control is used to control the flow of real power between the AC input and the DC bus of the individual cell, while the amplitude control can be used to control the flow of reactive power.

While the active input end concept has been utilized in prior art for variable frequency or variable voltage drives, it is utilized here in conjunction with modular converters connected in series on both the input and output. Some of the advantages of such topography include operation with low input voltage or imbalanced input voltage (assuming power component design margins are addressed). Also, the isolation transformer in each cell is dependent only on the cell rating, not on the voltage and/or horsepower rating of the total drive.

As described earlier, FIG. 5 can use a step-up transformer in the output side. This has certain advantages where applications require higher output voltages than can be practically accommodated with present IGBT device ratings. It also has the advantage of using the transformer leakage reactance to aid in the filtering of output voltage ripple and to reduce undesirable standing wave voltage effects. Another advantage of this topography is the inability to produce unwanted DC motor currents. While it has been described that there may be specific drive applications in which the topography of FIG. 5 is advantageous, there may be other applications in which the specific cell of FIG. 5 has some disadvantages. One of these disadvantages may be that the transformer iron will have to be increased to allow for voltage boost applications during high load currents at low speeds, such as high torque starting applications. In such applications the flux requirements could double or quadruple. However, for applications where high voltage is required, such as down hole pumps, the cell of FIG. 5 may have advantages that far outweigh other disadvantages. As described above, in applications where voltage boost is required, the output transformer flux rating can easily increase by a factor of 2 to 4.0. This transformer size and rating penalty can be avoided if one side (step-up) of cells (for example A3, B3, C3) is replaced with a set of step-down cells, whose outputs are directly connected to the load. The control of cells A3, B3 and C3 can be altered such that the extra voltage required for boost is produced by these cells only while the other cells A1, B1, C1, A2, B2, C2 (of the "step-up" type) are controlled to generate no more than rated flux at their respective outputs. This control and topography modification prevents the load requirement of voltage boost from increasing the (output) transformer rating in the "step-up" cells. However, the cells are not identical any more but are a mixture of the two proposed embodiments.

The "step-down" topography shown in FIG. 6 has the advantage that it does not require extra iron for high flux load starting. Therefore, where high motor starting currents are foreseen, it may be desirable to use the topography of FIG. 6 cell rather than that of FIG. 5. The topography of FIG. 6 may also be the choice for applications in which the primary voltage greatly exceeds the output voltage requirements. In that case, the transformer windings NP and NS can be selected so as to provide a "step-down" voltage. In such applications it may be possible that some or all of the input reactance requirement could be replaced by the transformer leakage reactance in the cell of FIG. 6. Due to the series nature of both the input and the output cell connection, failed cell bypass operation taught by U.S. Pat. No. 5,986,909 can be utilized to increase drive reliability.

FIGS. 10–14 depict the simulations of the input current waveforms under different amplitude control and phase control conditions for the three-cell embodiment that was shown in FIG. 4.

Figure 10:
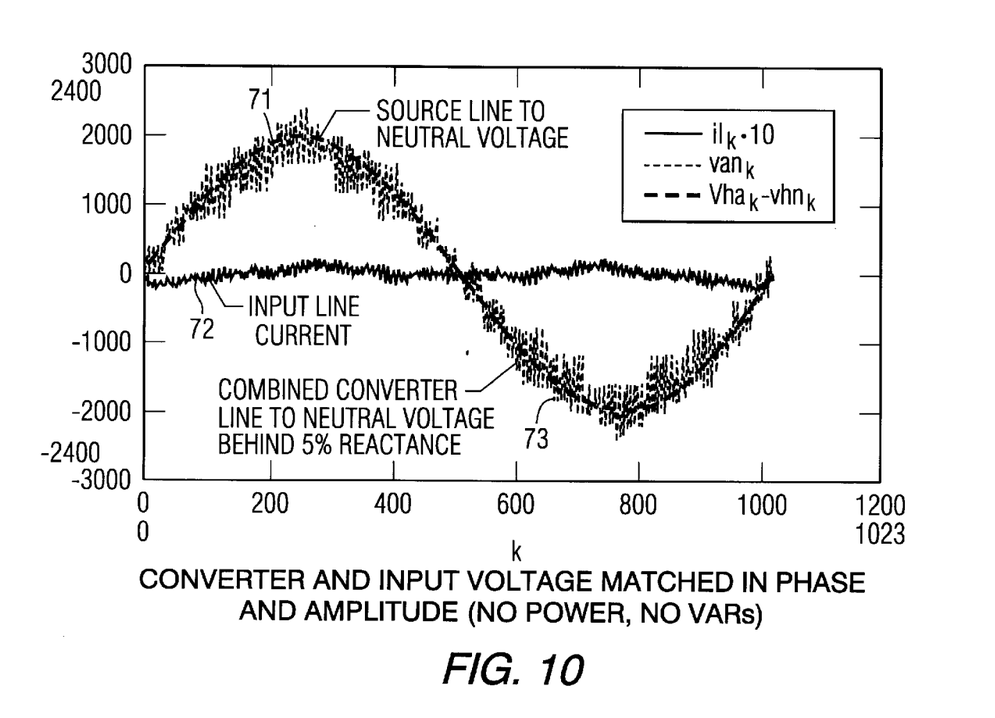
FIG. 10 shows the converter and input voltage matched in phase and amplitude (no power, no VARS).

FIG. 10 shows the condition in which the input line to neutral voltage (33) supplied to the series connected inputs of the cells perfectly matched in both amplitude and phase, the Line to neutral voltage developed by the combined series inputs of the cells. Note under this condition, no fundamental current flows between the source and the input to the converter.

Figure 11:
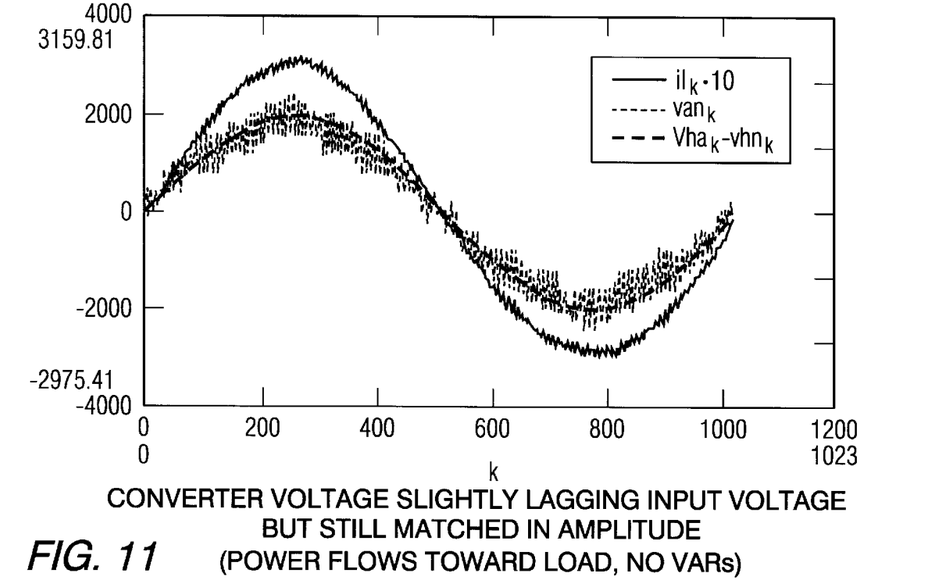
FIG. 11 shows the converter voltage slightly lagging the input voltage but still matched in amplitude (power flows toward load, no VARS).

FIG. 11 shows the condition in which the input line to neutral voltage (33) to the series connected inputs of the cells perfectly match only the amplitude of the Line to neutral voltage developed by the combined series input of the cells. The phase between these voltages is shifted only slightly such that the line to neutral voltage developed by the combined series inputs of the cells slightly lags in phase with respect to the line to neutral source voltage. Note under this condition, fundamental current in phase with the source voltage flows such that real power is transferred between the source (33) and converter.

Figure 12:
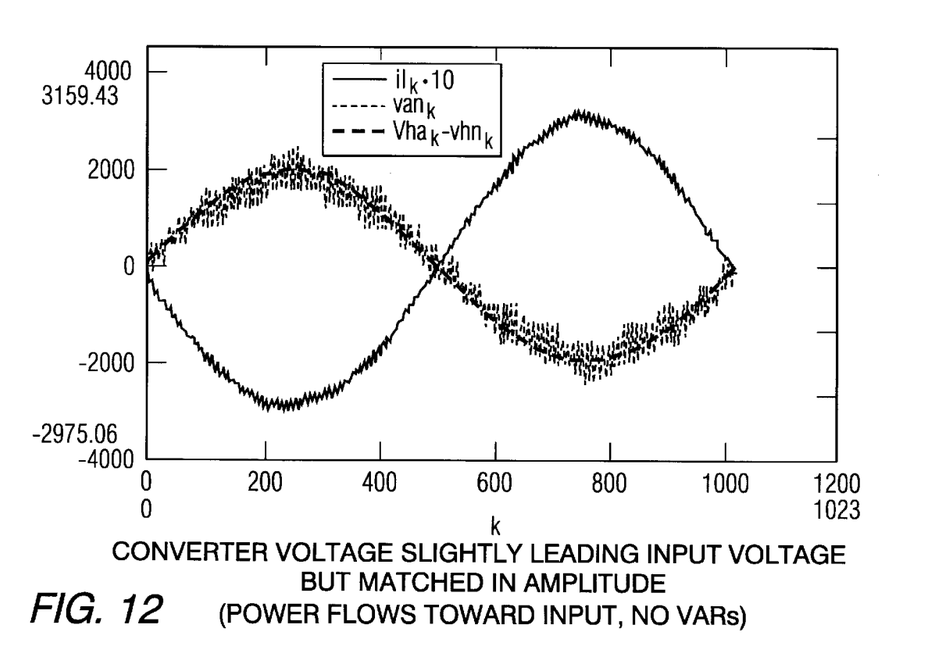
FIG. 12 shows converter voltage slightly leading the input voltage but matched in amplitude (power flows toward input, no VARS).

FIG. 12 shows the condition in which the input line to neutral voltage (33) to the series connected inputs of the cells perfectly match only the amplitude of the Line to neutral voltage developed by the combined series input of the cells. The phase between these voltages is shifted only slightly such that the line to neutral voltage developed by the combined series inputs of the cells slightly leads in phase with respect to the line to neutral source voltage. Note under this condition, fundamental current in phase with the source voltage flows such that real power is transferred between the converter and source (33).

Figure 13:
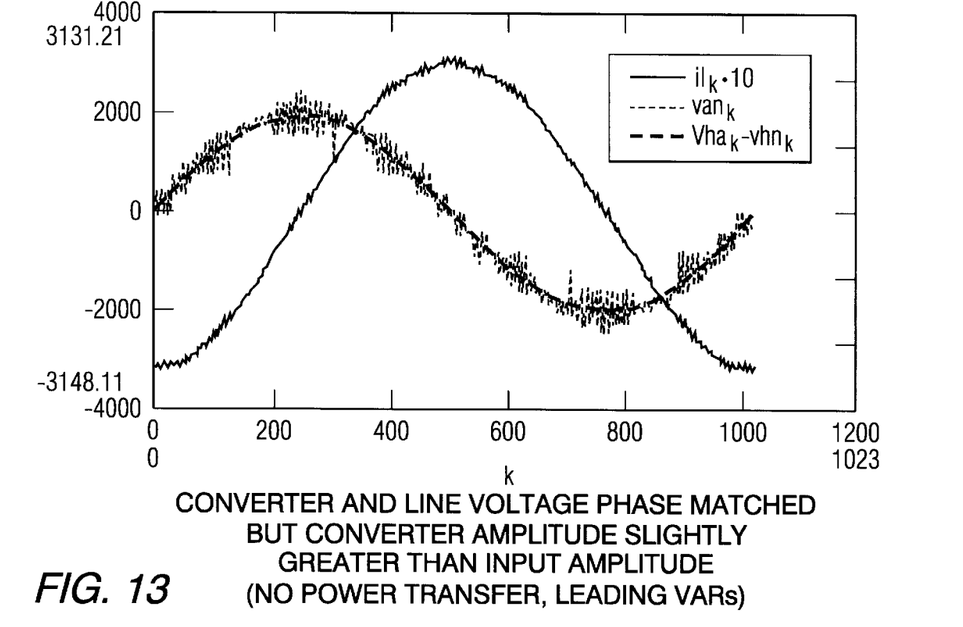
FIG. 13 shows the converter and input voltage matched in phase, but the converter amplitude slightly greater than the input amplitude (no power, leading VARS).

FIG. 13 shows the condition in which the input line to neutral voltage (33) to the series connected inputs of the cells perfectly match only the phase of the Line to neutral voltage developed by the combined series input of the cells. The amplitude of the converter voltages developed by the combined series inputs of the cells is made slightly greater than the line to neutral source voltage (33). Note under this condition, fundamental current in quadrature with the source voltage flows such that reactive leading power (VARS) is supplied to the source (33) from the converter.

Figure 14:
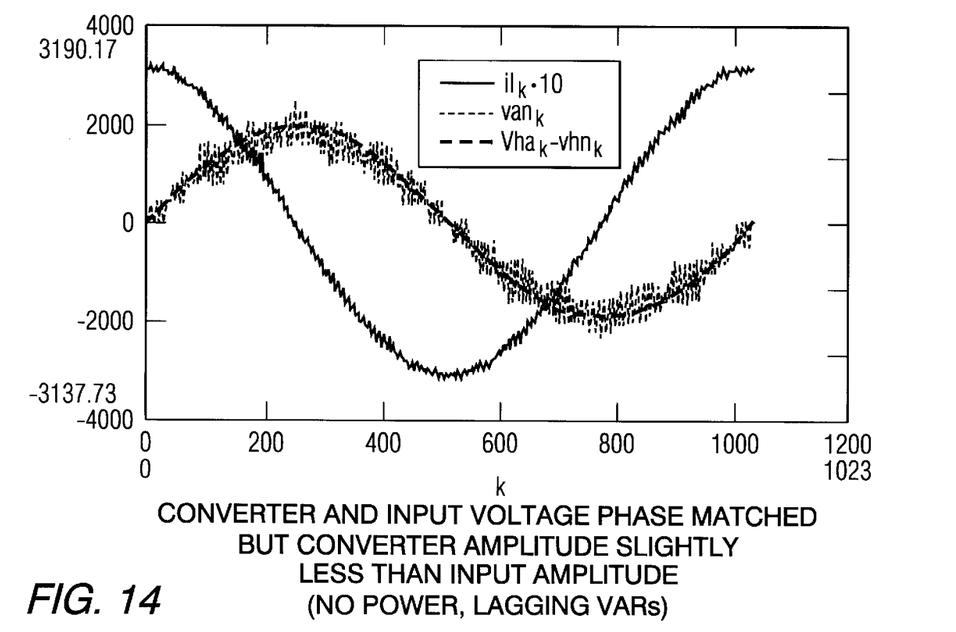
FIG. 14 shows the converter and input voltage match in phase, but the converter amplitude slightly less than the input amplitude (no power, lagging VARS).

FIG. 14 shows the condition in which the input line to neutral voltage (33) to the series connected inputs of the cells perfectly match only the phase of the Line to neutral voltage developed by the combined series input of the cells. The amplitude of the converter voltages developed by the combined series inputs of the cells is made slightly less than the line to neutral source voltage (33). Note under this condition, fundamental current in quadrature with the source voltage flows such that reactive lagging power (VARS) is supplied to the source (33) from the converter.

Note that since only 5% reactance is used in the simulations depicted in FIGS. 10–14, very little change in both phase and amplitude of the converter waveform is required to exercise the input section to produce all four power conversion modes at rated conditions.

The utilization of any topography depends on a number of practical considerations including the cost of component devices. Because of this, a drive that utilizes single-phase cells, extra input transistors and diodes may only be cost justified where four-quadrant operation is desired. In addition, when utilizing the fast-recovery diodes within switches g1–g4, these devices may not be capable of withstanding the current during a precharge inrush with only a small filter reactance.

While the preferred embodiment used to describe the invention as shown in FIG. 4 utilizes three cells per output phase, other embodiments are also included with the scope of this invention. Units having two cells per phase or a total of six cells per power supply can be utilized. In addition where voltage limits are practical and the application justifies the cost, four, five, six or more cells can be placed in each output phase line. In addition, it may be advantageous to construct each cell such that they are all identical and therefore interchangeable. It will also be desirable as discussed in the U.S. Pat. No. 5,625,545 to utilize a master controller and fiber-optic interconnection to each of the individual cells. Drive, housing and construction could also be utilized wherein the "step-up or step-down" cells could alternatively be utilized in the same physical drive structure.

What is claimed is:

1. An adjustable frequency power supply to control power flow between a load and an AC source:
    (a) said power supply having a plurality of cells in each phase output;
    (b) said plurality of cells each having an input side and an output side;
    (c) said input side capable of converting single-phase AC into DC;
    (d) said output side capable of converting DC into AC to said source;
    (e) said output side capable of converting said DC into a controlled AC output and for converting AC from said load to feed said input side;
    (f) respective outputs of said plurality of cells being connected in series; and
    (g) respective inputs of said power cells being connected in series.

2. The power supply of claim 1 further comprising cells which have a single-phase transformer connected either to said input side or said output side.

3. The power supply of claim 1 further comprising said output side controlled to limit the harmonic content of the output AC to a load.

4. The power supply of claim 1 further comprising said input side controllable to limit harmonic content of the AC power connected to the source.

5. The power supply of claim 1 further comprising said input side being interdigitated to limit harmonic components to said source.

6. The power supply of claim 1 further comprising said output side being interdigitated to reduce the harmonic content of the AC supplied to said load.

7. The power supply of claim 1 further comprising said input side and said output side being pulse width modulated.

8. The power supply of claim 2 further comprising a single phase transformer connected to said input side of a preselected number of said cells; and a single phase transformer connected to the output side of at least one of said output sides.

9. The power supply of claim 8 wherein said at least one transformer connected to said output side provides voltage boost.

10. The power supply of claim 8 wherein said at least one transformer connected to said output side provides voltage step down.

11. The power supply of claim 8 wherein said at least one transformer connected to said output side provides voltage step up.

12. An adjustable frequency power supply to control power flow between a load and an AC source:
    (a) said power supply having a plurality of cells in each phase output;
    (b) said plurality of cells each having an input side and an output side;
    (c) said input side capable of converting single-phase AC into DC;
    (d) said output side capable of converting DC into AC to said source;
    (e) said output side capable of converting said DC into a controlled AC output and for converting AC from said load to feed said input side;

(f) respective outputs of said plurality of cells being connected in series;

(g) respective inputs of said power cells being connected in series;

(h) each of said plurality of cells having a single phase transformer connected to at least one of said input side or said output side; and (i) said input and output sides controlled to limit harmonic components.

13. A method of controlling power to a load comprising:

(a) supplying power to a three phase load from a plurality of cells in each phase output;

(b) converting input AC to DC and converting said DC to output AC in each of said power cells;

(c) supplying the input AC to said cells through a series arrangement of said cells; and (d) providing the AC output of said cells to said load through a series interconnection of said cells.

14. The method of claim 13 further comprising transforming at least one of said inputs and outputs of each of said plurality of cells.

15. The method of claim 14 further comprising transforming the output of at least one of said plurality of cells to provide voltage boost.

16. The method of claim 13 further comprising controlling said converting of AC to DC and converting of DC to AC to provide power regeneration from said load to said input AC.

17. The method of claim 15 further comprising controlling said converting of AC to DC and converting of DC to AC to provide power regeneration from said load to said input AC.

18. The method of claim 13 further comprising controlling said converting input AC to DC and controlling said DC to AC output to reduce harmonic to said load and to the AC source.

19. The method of claim 18 further comprising controlling said converting of AC to DC and converting of DC to AC to provide power regeneration from said load to said input AC.

* * * * *